Patented Nov. 18, 1941

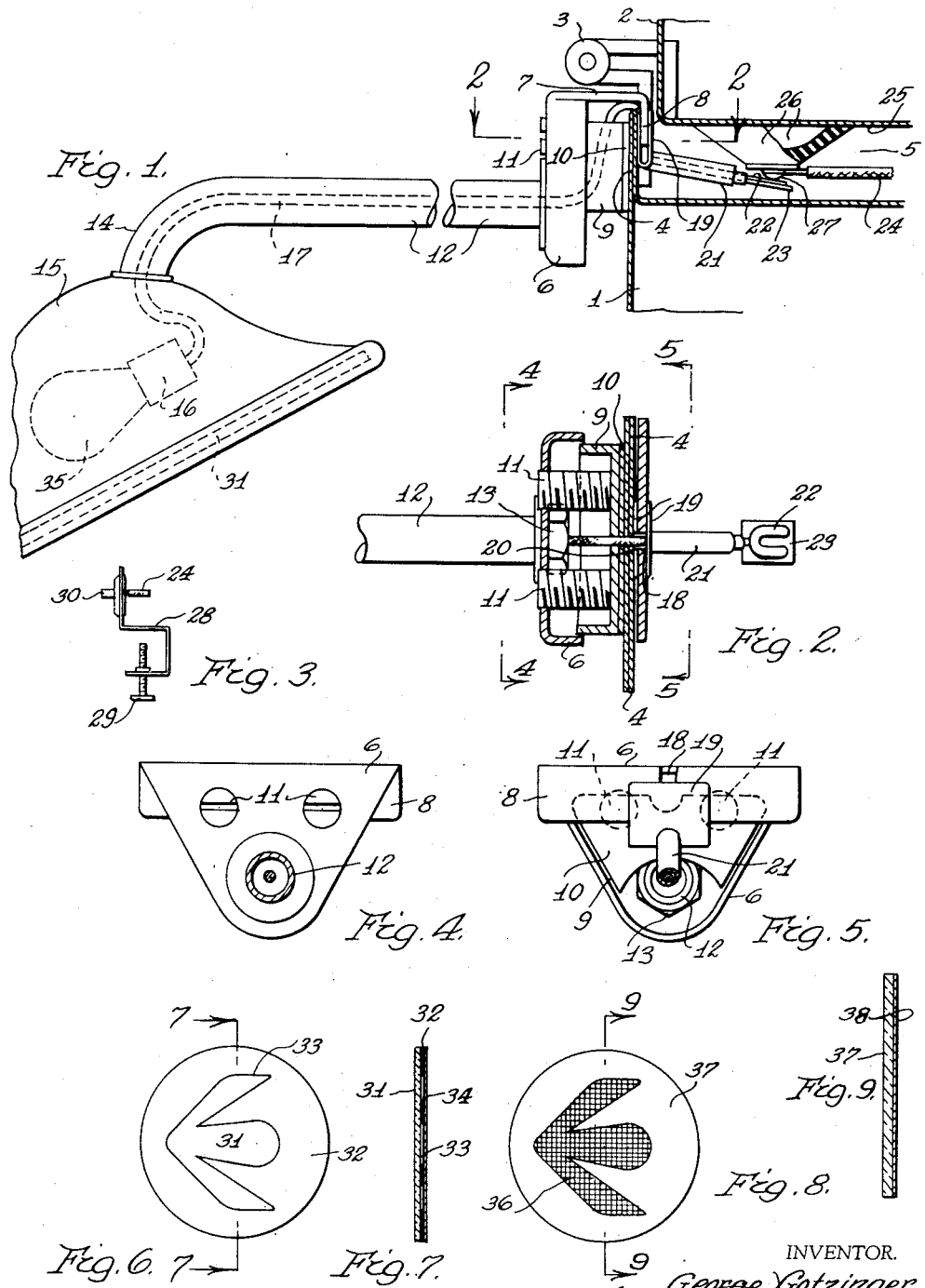

2,263,382

UNITED STATES PATENT OFFICE 2,263,382

MIRROR SIGNAL

George Gotzinger, Detroit, Mich.

Application June 19, 1939, Serial No. 279,800

1 Claim. (Cl. 177—329)

The present invention pertains to a novel signalling device for motor vehicles. The principal object of the invention is to provide such a device in association with a rear and side view mirror.

This mirror is usually carried by an arm extending laterally from the vehicle body. According to the invention, the mirror is mounted in a bell or housing containing an electric lamp. The mirror itself has a transparent backing or silvering which becomes non-reflecting when illuminated from behind.

The invention provides for permitting light to pass only through a limited area of the mirror in the form of a signal or symbol. This may be done by means of a stencil behind the mirror or by scratched lines in the back of the mirror and may be backed by a colored transparency in either case.

The conductor from the lamp is extended to a switch within the vehicle, and it has been found convenient to pass the wiring between two relatively swinging parts of the vehicle body, such as between a door and post. In this connection, it is an object of the invention to avoid mutilation of the conductor by the constant swinging of the door. Accordingly, the conductor is separated in this space, one part having a bare end rigidly supported to maintain a definite position. The other part of the conductor terminates at a bare contact supported by the opposite body member by a suitable means such as a vacuum cup. The free end is in engagement with the conductor when the door is closed. On opening the door, the rigidly supported part of the conductor merely moves away from the contact, with the result that there is no flexing of the conductor during the movement of the door, and breaking of the conductor is thereby avoided.

The invention is fully disclosed by way of example in the following description and in the accompanying drawing in which:

Figure 1 is a detail plan section of a portion of an automobile body, showing the signalling device in position;

Figure 2 is a section on the line 2—2 of Figure 1;

Figure 3 is a detail elevation of the bracket switch;

Figure 4 is a section on the line 4—4 of Figure 2, the automobile body portion being omitted;

Figure 5 is a section on the line 5—5 of Figure 2, the automobile body portion being omitted;

Figure 6 is a rear elevation of the transparent mirror with the stencil applied thereto, Figure 7 is a section on the line 7—7 of Figure 6, Figure 8 is a rear elevation of the etched or scratched transparent mirror, and Figure 9 is a section on the line 9—9 of Figure 8.

Reference to these views will now be made by use of like characters which are employed to designate corresponding parts throughout.

In Figure 1 are shown relatively swinging parts 1 and 2 of an automobile body which may be, respectively, the swinging door and a fixed post. The parts are joined together by a hinge 3 of conventional design. The door 1 has a lip or flange 4 that covers the space 5 between the parts.

The lip 4 is used for supporting a laterally extending mirror structure which will now be described. The attaching device comprises a hollow bracket 6 with a lateral flange 7 from which extends a lip 8 adapted to engage the inner surface of the lip 4, as shown in Figure 1. Within the bracket 6 is mounted a lose clamp 9 having one face padded at 10 to engage the outer surface of the lip 4 and yet not scratch it, as illustrated in Figure 2. A pair of studs 11 threaded through the back of the bracket 6 tightens the clamp 9 and flange 7 against the lip 4.

From the bracket extends a tube 12 held thereto by a nut 13. The outer end of the tube is bent at 14 and carries a lamp housing or bell 15, in the mouth of which is mounted a mirror and lens structure as will presently be described. Within the bell is mounted in the usual manner a lamp socket 16 having a terminal grounded thereto in any suitable manner. A single conductor 17 extends from the socket through the tube and into the bracket 6. The conductor passes over the free vertical edge of the lip 4, as shown in Figure 1, and through an aperture 18 in the lip 8, as shown in Figure 2. A clip 19 is mounted on the lip 8 and is apertured at 20 to receive and retain the conductor 17. The conductor, which is sheathed in insulation in the usual manner, passes through a supporting tube 21 secured to the clip 19 for the purpose of maintaining this portion of the conductor in a rigid position. At the extremity of the conductor is a metal contact 22 backed by a sheet of insulation 23.

The opposite surface of the member 2 is utilized to support the continuation of the conductor in a manner whereby no portion of the conductor becomes tangled or otherwise adversely effected by the repeated opening and closing of the door.

The continuation of the conductor 17 is another similar conductor 24 leading to a switch as will presently be described. The conductor 24 is supported from the inner surface 25 of the member 2 by any suitable means such as a vacuum cup 26 having an exposed contact point 27 to which the conductor 24 is connected. In the closed position of the door, as illustrated in Figure 1, this contact point is engaged by the contact 22 of conductor 17 and is prevented by the insulation 23 from engaging the member 1. When the door opens, the contact 22 merely swings away from the contact 27. The breaking of the circuit thereby is not material, since the lamp is not in service at this time. When the door is closed, the contacts engage each other again. In both the engaging and disengaging operations, there is no flexing of the conductor which would eventually cause a break if the conductor were continuous.

The conductor 24 extends to a bracket switch 28 secured to any convenient part of the vehicle by means of a clamp screw 29. The finger piece of the switch is designated by the numeral 30. The remaining terminal of the switch is connected to the underground terminal of the storage battery, whereby the circuit is completed.

The lens and the mirror structure mounted in the mouth of the bell 15 include a transparent mirror 31, that is, one that becomes transparent when illuminated from behind but otherwise functions as a reflector. Behind the member 31 is a stencil 32 with a cut-out symbol 33, and behind the stencil is a colored transparent sheet 34, preferably red. Normally the device serves as a side and rear view mirror in the ordinary manner. When the operator wishes to give a signal, he throws the finger 30 to close the circuit and light the lamp 35 in the socket 16. The member is thereby rendered transparent at the cut-out 33, showing illumination colored by the sheet 34. For example, the cut-out may be in the form of an arrow pointing to the left, and the device used for signalling a left turn.

In the modification shown in Figures 8 and 9, the symbol 36 is scratched in the back or silvering of the transparent mirror 37. This takes the place of the stencil. Behind the mirror is mounted a colored transparent sheet 38 similar to the sheet 34 above described. When the light is turned on, there is illumination through the scratched lines which are so fine as to be hardly noticeable when not illuminated. Also, the illumination is diffused in the scratches and presents the appearance of a solid area of color.

Although a specific embodiment of the invention has been illustrated and described, it will be understood that various alterations in the details of construction may be made without departing from the scope of the invention, as indicated by the appended claim.

What I claim is:

In an automobile body having a door hinged thereon and forming a space with a part of the body, a bracket having a lip overhanging a portion of said door, a loose clamp in said bracket engaging the same portion of the door opposite said lip, means in said bracket for tightening said clamp against said portion, a laterally extending signal arm supported by said bracket, an electric lamp carried by said arm, a clip mounted on said lip, a rigid support attached to said clip and extending into said space, a conductor extending from said lamp through said arm, bracket and clip into said support and having a contact exposed in said space, a contact supported by said body, another conductor extending from said last named contact, said contacts being engageable and disengageable on swinging of said door.

GEORGE GOTZINGER.